US010384714B2

(12) United States Patent
Hood et al.

(10) Patent No.: US 10,384,714 B2
(45) Date of Patent: Aug. 20, 2019

(54) DIRECT DRIVE PIVOT AND PIVOT LOCKUP OF A TRANSMISSION SYSTEM AND METHOD THEREOF

(71) Applicant: Allison Transmission, Inc., Indianapolis, IN (US)

(72) Inventors: Robert C. Hood, Indianapolis, IN (US); Kelly L. Jones, Clayton, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 61 days.

(21) Appl. No.: 15/834,267

(22) Filed: Dec. 7, 2017

(65) Prior Publication Data

US 2018/0170426 A1 Jun. 21, 2018

Related U.S. Application Data

(60) Provisional application No. 62/435,155, filed on Dec. 16, 2016.

(51) Int. Cl.
*F16H 47/04* (2006.01)
*B62D 11/18* (2006.01)
(Continued)

(52) U.S. Cl.
CPC .......... *B62D 11/003* (2013.01); *B62D 11/005* (2013.01); *B62D 11/18* (2013.01); *B62D 11/183* (2013.01); *E02F 9/202* (2013.01); *E02F 9/2079* (2013.01); *E02F 9/2087* (2013.01); *E02F 9/225* (2013.01); *E02F 9/2253* (2013.01);
(Continued)

(58) Field of Classification Search
None
See application file for complete search history.

(56) References Cited

U.S. PATENT DOCUMENTS 4,215,755 A   8/1980   McKnight et al.
5,325,993 A   7/1994   Shigenori
(Continued)

FOREIGN PATENT DOCUMENTS

DE   19631014 A1   2/1998
EP   2684772 A2   1/2014

OTHER PUBLICATIONS

European Search Report & Opinion, European Patent Office, European Application No. 17 20 7828, dated May 22, 2018, pp. 1-5.

*Primary Examiner* — Colby M Hansen
(74) *Attorney, Agent, or Firm* — Taft Stettinius & Hollister LLP; Stephen F. Rost (57) ABSTRACT

A method of controlling a transmission includes providing an input, an output, a controller, a control system, a hydrostatic unit, and a geartrain. The geartrain includes a direct drive pivot clutch and a steer drive geartrain. The method also includes receiving a pivot command by the controller from a shift selector, where the command indicates the shift selector is in a pivot position. The method further includes engaging the direct drive pivot clutch, decoupling the hydrostatic unit from a torque path defined between the input and the output, and coupling the input and the output to one another via a second torque path. The second torque path is defined through the direct drive pivot clutch and the steer drive geartrain. The transmission is controllable in a direct drive steer operation.

20 Claims, 5 Drawing Sheets

(51) Int. Cl.
*B62D 11/00* (2006.01)
*F16H 59/02* (2006.01)
*E02F 9/22* (2006.01)
*F16H 47/02* (2006.01)
*E02F 9/20* (2006.01)
*F16H 61/14* (2006.01)
*F16H 59/46* (2006.01)

(52) U.S. Cl.
CPC .............. *F16H 47/02* (2013.01); *F16H 47/04* (2013.01); *F16H 59/0217* (2013.01); *F16H 61/143* (2013.01); *F16H 2059/467* (2013.01)

(56) References Cited

U.S. PATENT DOCUMENTS

| | | | | |
|---|---|---|---|---|
| 5,477,454 | A | * | 12/1995 | Ishino .................. B62D 11/183 180/6.7 |
| 5,830,097 | A | * | 11/1998 | Larkin .................... F16H 47/04 475/72 |
| 6,042,496 | A | * | 3/2000 | Lehle ....................... F16H 47/04 475/72 |
| 6,090,005 | A | * | 7/2000 | Schmidt ................. B60K 6/365 475/2 |
| 6,413,187 | B1 | * | 7/2002 | Mori ....................... F16H 15/38 476/40 |
| 6,435,999 | B1 | * | 8/2002 | Nanri .................... F16H 61/425 475/76 |
| 6,530,855 | B1 | * | 3/2003 | Folsom ................... F16H 47/04 475/72 |
| 2005/0054469 | A1 | | 3/2005 | Dyck et al. |

* cited by examiner

DIRECT DRIVE PIVOT AND PIVOT LOCKUP OF A TRANSMISSION SYSTEM AND METHOD THEREOF

RELATED APPLICATIONS

The present application claims the benefit of U.S. Provisional Application Ser. No. 62/435,155, filed Dec. 16, 2016, the disclosure of which is hereby incorporated by reference in its entirety.

FIELD OF THE DISCLOSURE

The present disclosure relates to a method of controlling a transmission system, and in particular to a method of controlling direct drive pivot and pivot lockup of a transmission system.

BACKGROUND

In a conventional vehicle or work machine, a transmission system transfers torque from an engine or prime mover to a ground-engaging mechanism such as a wheel or track. In a tracked vehicle, for example, a transmission may transfer torque to the tracks to allow the vehicle or machine to move in a forward or reverse direction. If an operator wants to steer the vehicle or machine through a tight turn, the transmission system may include a pivot steer system to do so. To pivot, however, transmission efficiency can be affected by different fluid coupling devices such as a torque converter or hydrostatic steer unit (HSU). These fluid coupling devices may produce losses in the transmission system such that efficiency, i.e., ratio of power into the system versus power out of the system, is reduced. Thus, there is a need to improve efficiency of a transmission system that includes a pivot steer system.

SUMMARY

In one embodiment of the present disclosure, a method of controlling a transmission includes providing an input, an output, a control system, a hydrostatic unit, and a geartrain, the geartrain including a direct drive pivot clutch and a steer drive geartrain; receiving a pivot command from a shift selector, the command indicating the shift selector is in a pivot position; engaging the direct drive pivot clutch; decoupling the hydrostatic unit from a first torque path defined between the input and the output; coupling the input and the output to one another via a second torque path, the second torque path defined through the direct drive pivot clutch and the steer drive geartrain; and controlling the transmission in a direct drive steer operation.

In one example of this embodiment, the method may include providing a hydrostatic unit disconnect mechanism selectively coupled between the hydrostatic unit and the steer drive geartrain; and energizing the hydrostatic unit disconnect mechanism to decouple the hydrostatic unit. In a second example, the energizing step includes sending an instruction to the control system to energize the hydrostatic unit disconnect mechanism. In a third example, the method may include directly coupling the direct drive pivot clutch to the steer drive geartrain. In a further example, the method may include communicating to the control system to engage the direct drive pivot clutch after the receiving step.

In another embodiment of this disclosure, a method of controlling a transmission includes providing the transmission with an input, an output, a control system, a torque converter, a lockup clutch, a hydrostatic unit, and a geartrain, the geartrain including a first directional clutch, a second directional clutch, a direct drive pivot clutch, and a steer drive geartrain; receiving a pivot command from a shift selector, the command indicating the shift selector is in a pivot position; engaging the direct drive pivot clutch; decoupling the hydrostatic unit from a first torque path defined between the input and the output; receiving a steer command from a steering device, the steer command indicating a steer direction; engaging either the first or second directional clutch based on the steer command; detecting an input speed by a first sensor and a turbine speed by a second sensor; comparing a ratio of the input speed and turbine speed to a threshold; engaging the lockup clutch when the ratio of the input speed and turbine speed satisfy the threshold; coupling the input and the output to one another via a second torque path, the second torque path defined through the lockup clutch, the direct drive pivot clutch and the steer drive geartrain; and controlling the transmission in a pivot lockup steer operation.

In one example of this embodiment, the method may include providing a hydrostatic unit disconnect mechanism selectively coupled between the hydrostatic unit and the steer drive geartrain; and energizing the hydrostatic unit disconnect mechanism to decouple the hydrostatic unit. In a second example, the energizing step includes sending an instruction to the control system to energize the hydrostatic unit disconnect mechanism. In a third example, the method may include directly coupling the direct drive pivot clutch to the steer drive geartrain. In a fourth example, the method may include communicating to the control system to engage the direct drive pivot clutch after the receiving a pivot command step. In a fifth example, the detecting an input speed comprises detecting input speed at the input or at a location between the input and the torque converter; and the detecting a turbine speed comprises detecting turbine speed at a location between the first and second directional clutches and the direct drive pivot clutch.

In a sixth example, the receiving a steer command includes detecting a movement of a steering device in the steer direction. In a seventh example, the method may include providing a steer planetary gearset and an output planetary gearset between the input and the output, the steer planetary gearset including a sun gear, a carrier assembly, and a ring gear; wherein the decoupling step includes decoupling the hydrostatic unit from the sun gear of the steer planetary gearset. In an eighth example, the method may include transferring torque through the carrier assembly of the steer planetary gearset to a sun gear of the output planetary gearset. In another example, the method may include transferring torque to the output via the carrier assembly of the output planetary gearset. In a further example, the method may include providing a steer transfer shaft of the steer drive geartrain, the steer transfer shaft disposed between the direct drive pivot clutch and the output; and transferring a first portion of the torque from the input to a first side and a second portion of the torque to a second side of the transmission via a steer transfer shaft.

In a further embodiment, a transmission system includes a controller for controlling the transmission system, the controller configured to be in communication with a shift selector and a throttle input; an input configured to receive input power; an output coupled to the input, the output configured to deliver output power; a control system disposed in communication with the controller; a geartrain coupled to the control system, the geartrain including a first directional clutch, a second directional clutch, a direct drive pivot clutch, and a steer drive geartrain; a hydrostatic unit including a pump and a motor, the pump being operably coupled to the input and the motor being operably coupled to the output; and a hydrostatic unit disconnect mechanism disposed between the hydrostatic unit and the output, the hydrostatic unit disconnect mechanism being operably controlled between a coupled position and a decoupled position; wherein, the transmission system is configurable in a normal operation, a direct drive steer operation, and a pivot lockup operation; wherein, when configured in the direct drive steer operation, the direct drive pivot clutch is disposed in its engaged position, the hydrostatic unit disconnect mechanism is disposed in its decoupled position, and the hydrostatic unit is disconnected from the steer drive geartrain and the output.

In one example of this embodiment, the system may include a torque path defined between the input and the output, wherein in normal operation, the torque path is defined between the input and the output through the hydrostatic unit and steer drive geartrain; and in direct drive steer operation, the torque path is defined between the input and the output through the direct drive pivot clutch and the steer drive geartrain. In another example, the system may include a torque converter and a lockup clutch; wherein, when configured in the pivot lockup operation, either the first or second directional clutch is disposed in its engaged position, the direct drive pivot clutch is disposed in its engaged position, the hydrostatic unit disconnect mechanism is disposed in its decoupled position, the hydrostatic unit is disconnected from the steer drive geartrain and the output, and the lockup clutch is disposed in its engaged position. In a further example, the transmission system may include a torque path defined between the input and the output, wherein in normal operation, the torque path is defined between the input and the output through the hydrostatic unit and steer drive geartrain; and in pivot lockup operation, the torque path is defined between the input and the output through the lockup clutch, the direct drive pivot clutch and the steer drive geartrain.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The terminology used herein is for the purpose of describing particular illustrative embodiments only and is not intended to be limiting. As used herein, the singular forms "a", "an" and "the" may be intended to include the plural forms as well, unless the context clearly indicates otherwise. Similarly, plural forms may have been used to describe particular illustrative embodiments when singular forms would be applicable as well. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1:
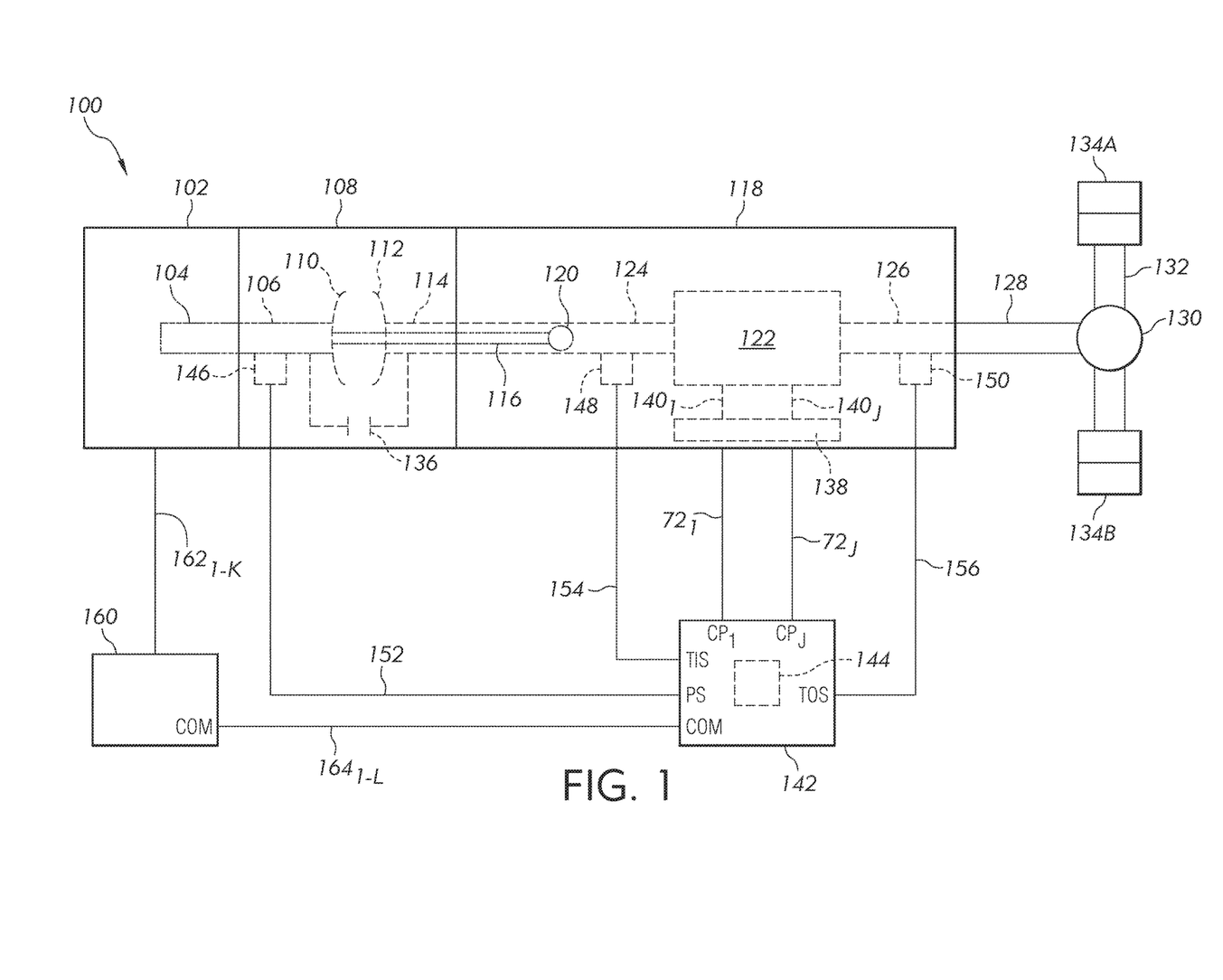
FIG. 1 is a block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the turbine shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Figure 2A:
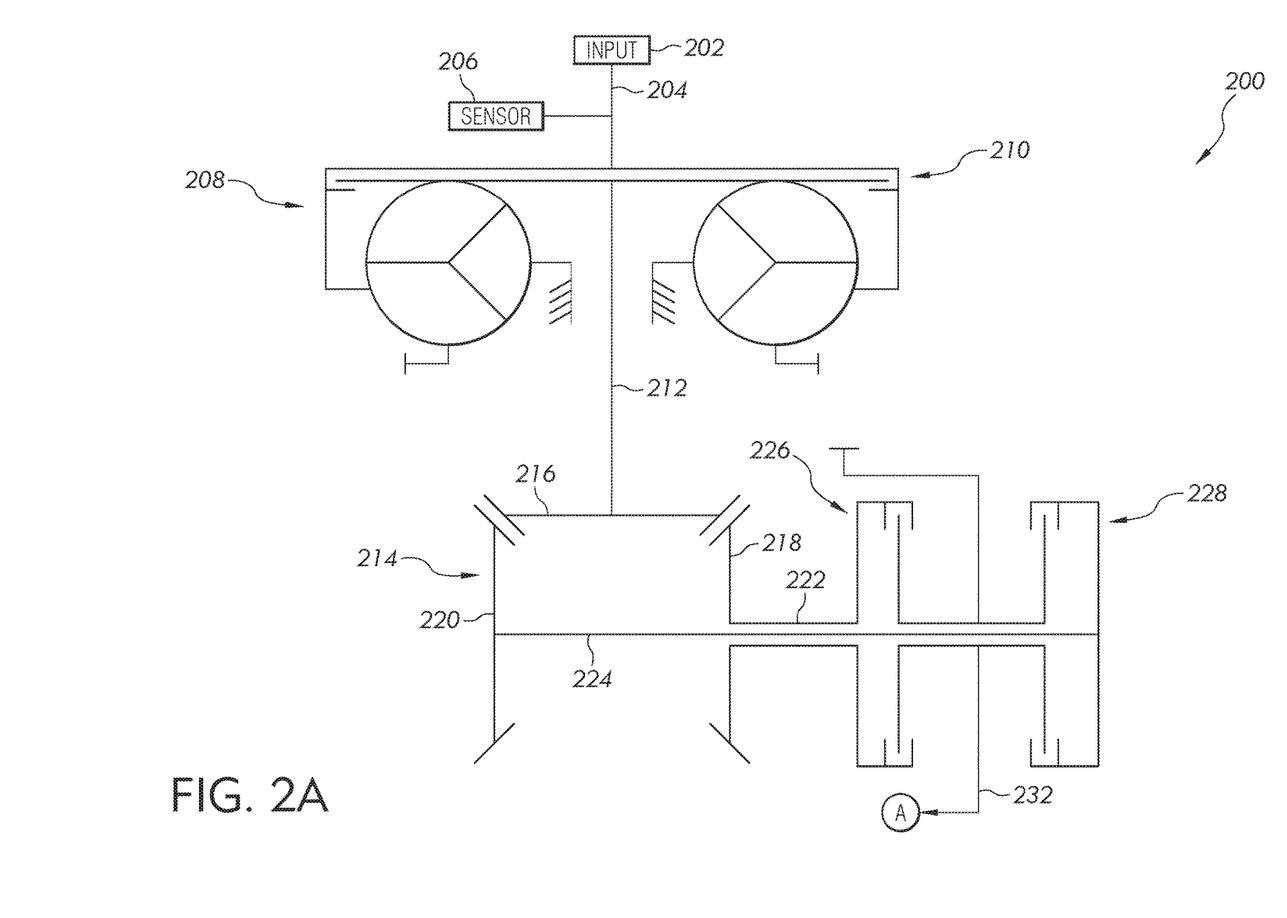
FIG. 2A is a first partial schematic view of a transmission system including a pivot steer system.
Figure 2B:
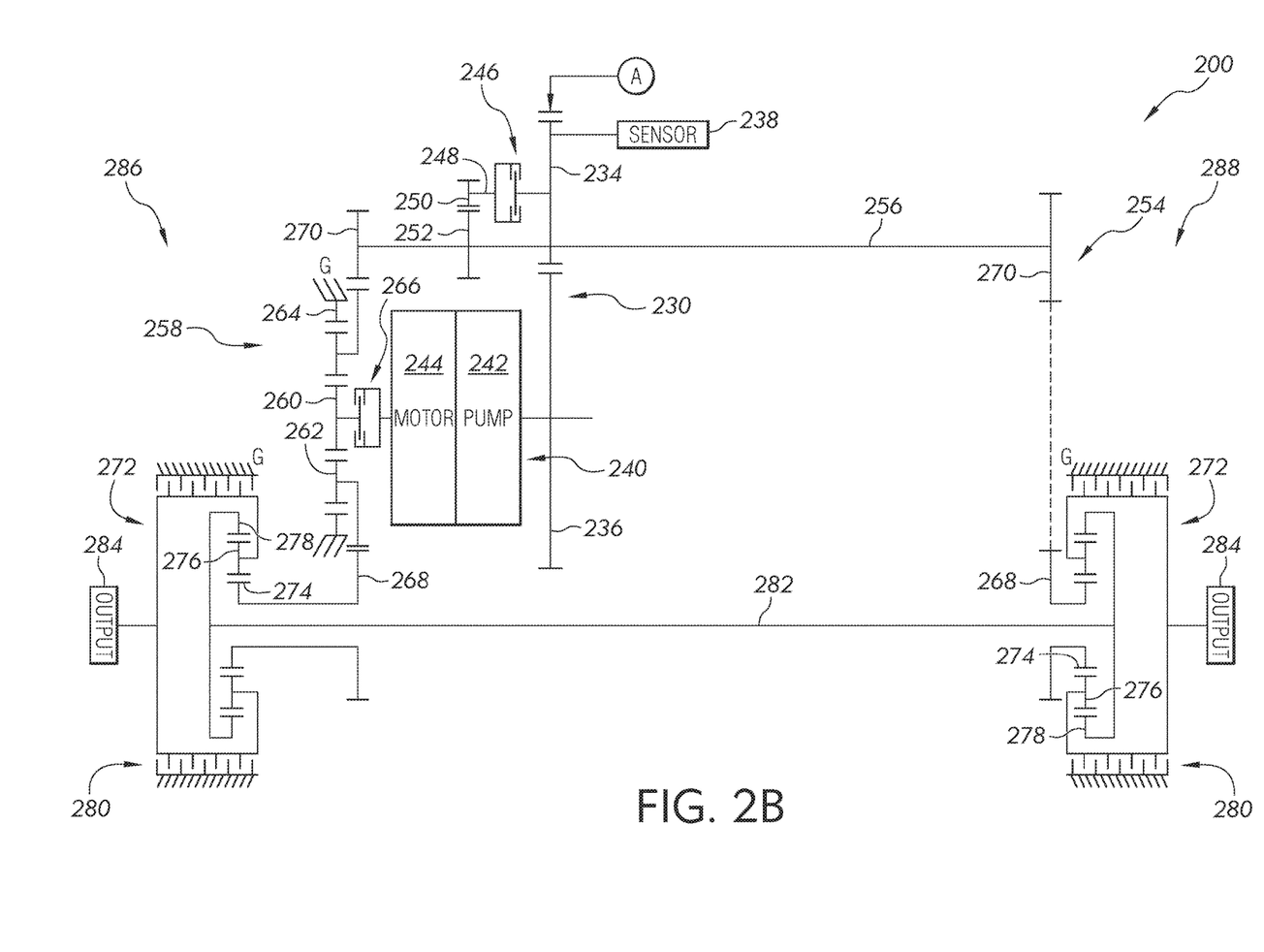
FIG. 2B is a second partial schematic view of the transmission system of FIG. 2A including a pivot steer system.

Referring to FIG. 2, one embodiment of a transmission system 200 is illustrated. The transmission system 200 includes an input 202 and an output 284. Torque may be provided at the input 202 by an engine (not shown), prime mover, or other torque-producing system. In this embodiment, the transmission system 200 includes a first side 286 and a second side 288. As shown, there is an output 284 at each side. The output 284 represents the transmission output in this embodiment. Output torque from the transmission output 284 may be delivered to a final drive assembly or other system to drive a ground-engaging mechanism such as a wheel or track.

The transmission system 200 may include an input shaft 204 which receives torque from the engine (not shown). A speed sensor 206 may be provided to detect or measure input speed based on the rotation of the input shaft 204. Alternatively, input speed (or engine speed) may be communicated to a transmission controller 310 (FIG. 3) via a J-1939 communication link or any other known means. Input speed and other characteristics, such as input torque, may be communicated to the transmission controller 310 from an engine controller 302 according to known methods.

The transmission system 200 may include a fluid coupling device such as a torque converter 208. The torque converter 208 may include a pump and a turbine. Moreover, a lockup clutch 210 may be provided as will be described in further detail.

Torque passing through the torque converter 208 drives a turbine shaft 212, as shown. The turbine shaft 212 is coupled between the torque converter 208 and a bevel gearset 214. The bevel gearset 214 may include a drive gear 216, a first driven gear 218 and a second driven gear 220. The drive gear 216 may be directly connected to the turbine shaft 212, and each driven gear may be coupled to a directional clutch.

In FIG. 2, the transmission system 200 includes a first directional clutch 226 and a second directional clutch 228. The first directional clutch 226 may be selectively engaged to allow the transmission output 284 to rotate in a forward direction or a reverse direction. The second directional clutch 228 may be selectively engaged to allow the transmission output 284 to rotate in a direction opposite of when the first directional clutch 226 is selectively engaged. Moreover, the directional clutches allow range clutch packs and a hydrostatic steer unit (HSU) 240 to be driven in either direction. Other directional clutches may be provided besides the ones depicted in FIG. 2. Moreover, if the transmission system is in a neutral position or range, one of the directional clutches may be selectively engaged. In other words, in one example, at least one of the directional clutches may be engaged in each selected position or range. In another example, however, there may be at least one position or range whereby neither or none of the directional clutches are selectively engaged.

For purposes of this disclosure, a selected position or range may include any gear ratio, speed ratio, position on a shift selector, or combination thereof. A shift selector may include a park position, a reverse position, a forward position, a neutral position, and a pivot position. The forward position may include a "low" and a "high" position. This may vary depending upon the type of vehicle or machine and its intended use. A four-wheel drive vehicle, for example, may include a "four-wheel drive" position and a "two-wheel drive" position. Thus, this disclosure is not intended to be limiting as it relates to any known type of position on a shift selector or range or ratio attainable by a transmission.

A first shaft 222 may be coupled between the first driven gear 218 and the first directional clutch 226. A second shaft 224 may be coupled between the second driven gear 220 and the second directional clutch 228. In other embodiments, a hub or gear may directly couple each driven gear to the directional clutch. The transmission controller 310 may selectively control the engagement or disengagement of the directional clutches. Other control means, such as the shift selector 304, for selectively engaging or disengaging the directional clutch is also possible. In any event, when the first directional clutch 226 is engaged, torque may transfer from the drive gear 216 to the first directional clutch 226 via the first driven gear 218 and first shaft 222.

The output of each directional clutch is coupled to a range input gearset 230. The range input gearset 230 may include one or more gears. In FIG. 2, the range input gearset 230 includes a first range gear 232, a second range gear 234, and a third range gear 236. The first range gear 232 may be directly coupled to the output of whichever directional clutch is engaged. Thus, torque passes through the engaged directional clutch to the first range gear 232, which is connected to the second range gear 234. The second range gear 234 is coupled to the third range gear 236, which is coupled to an input of the HSU 240. The input of the HSU 240 drives a pump 242, and the pump 242 drives a motor 244 which functions as an output of the HSU 240.

A hydrostatic steer unit disconnect mechanism 266 may be provided to disconnect the HSU 240 from being connected to the transmission output 284. In one embodiment, the HSU disconnect mechanism 266 is a clutch. In another embodiment, it may be a dog clutch, a mechanical diode, or any other type of selectively engageable device. The HSU disconnect mechanism 266 may normally be engaged so that the HSU 240 is connected to the transmission output 284. However, when the HSU disconnect mechanism 266 is selectively disengaged or de-energized, then the HSU 240 may be disconnected from the transmission output 284. When it is disconnected, the HSU 240 may still receive torque from the range input gearset 230, but the HSU 240 is unable to transfer any torque to the output 284.

A speed sensor 238 is also shown in FIG. 2. The speed sensor 238 can measure the rotational speed at a location downstream or after the directional clutches. Here, the speed sensor 238 can measure a rotational speed from the second range gear 234 so that both speed and direction are detectable. Thus, the speed sensor 238 may detect both rotational speed and direction in at least one embodiment. In this disclosure, the speed detected by the speed sensor 238 may be referred to as turbine speed.

The transmission system 200 may also include a direct drive pivot clutch 246. The direct drive pivot clutch 246 may be selectively engaged to allow the transmission system 200 to operate in a pivot mode. This is further described in FIG. 4. The direct drive pivot clutch 246 may normally be disengaged so that torque is transferred directly from the engaged directional clutch to the HSU 240. However, when the direct drive pivot clutch 246 is engaged, torque may transfer from the selectively engaged directional clutch through the direct drive pivot clutch 246 to a steer drive geartrain 254. The steer drive geartrain 254 may include the range input gearset 230, a first direct drive gear 250, a second direct drive gear 252, a steer transfer shaft 256, and a steer planetary gearset 258.

When the direct drive pivot clutch 246 is engaged, torque may pass from the selectively engaged directional clutch through the direct drive pivot clutch 246 to rotationally drive a direct drive shaft 248. The direct drive shaft 248 may be coupled to the first direct drive gear 250 and the second direct drive gear 252. The steer transfer shaft 256 may be coupled to the second direct drive gear 252 so that torque splits to the first side 286 and the second side 288 of the transmission system 200. When the direct drive pivot clutch 246 is disengaged, torque may be received from the HSU 240 and split via the steer transfer shaft 256 to both sides of the transmission system 200.

The steer planetary gearset 258 may include a sun gear 260, a carrier member or assembly 262, and a ring gear 264. As shown, the ring gear 264 may be connected to a housing of the transmission system 200 and thus is fixed from rotation. Input to the planetary gearset 258 is via the sun gear 260, and output is via the carrier member 262. The HSU 240 may be connected to the sun gear 260 under normal circumstances, and it is only disconnected when the HSU disconnect mechanism 266 is selectively controlled to its disengaged position or state. Thus, when the HSU disconnect mechanism 266 is engaged, torque may transfer from the HSU 240 into the steer planetary gearset 258 via the sun gear 260 and output via the carrier member 262. The carrier member 262 may be coupled to a steer gear 270, which in turn is coupled to the steer transfer shaft 256. Moreover, torque from the carrier member 262 may also be transferred to a second steer gear 268 which is coupled to an output planetary gearset 272.

When the HSU disconnect mechanism 266 is selectively controlled to its disengaged position, i.e., during a direct drive pivot or pivot lockup mode, torque is not transferred via the HSU 240. Instead, the direct drive pivot clutch 246 is engaged, as described above, and torque passes through the steer planetary gearset 258 via the carrier member 262. In other words, there is no torque passing to the sun gear 260. The carrier member 262 is coupled to a sun gear 274 of the output planetary gearset 272 via the second steer gear 268.

The output planetary gearset 272 may include the sun gear 274, a carrier assembly or member 276, and a ring gear 278. Here, the sun gear 274 is the input (i.e., steer input) of the output planetary gearset 272, and the carrier member 276 is the output of the gearset. The ring gear 278 may be the propulsion input and is coupled to a shaft 282 which may be splined to another gear or gearset (not shown). The carrier member 276 may be held or fixed from rotation by a brake 280, as shown in FIG. 2B.

The ring gear 278 is coupled to a transmission output shaft. There may be one or more output shafts. In one example, the ring gear 278 on the first side 286 is coupled to one output shaft, and the ring gear 278 on the second side 288 is coupled to a second output shaft. In any event, the one or more output shafts may be coupled, either directly or indirectly, to the transmission output 284.

When steering the vehicle or machine and operating the transmission system 200 in range (e.g., in a forward or reverse direction), torque is transferred through the HSU 240. However, the HSU 240 incurs losses when torque passes therethrough. The same is true with the torque converter 208. These losses reduce the overall efficiency of the transmission system 200. When an operator wants to pivot the vehicle or machine, e.g., to make a 90° turn, it is desirable to avert the losses of the torque converter 208 and HSU 240 and directly connect engine or input power to the steer drive geartrain 254. In addition, it is desirable to pivot the vehicle or machine without overheating the transmission system 200. To achieve high efficiency and avoid overheating the transmission system 200 during a pivot operation, it is desirable to provide a high efficiency pivot steer system. This may be achieved in at least one embodiment by disconnecting the HSU 240 and engaging lockup clutch 210.

Figure 3:
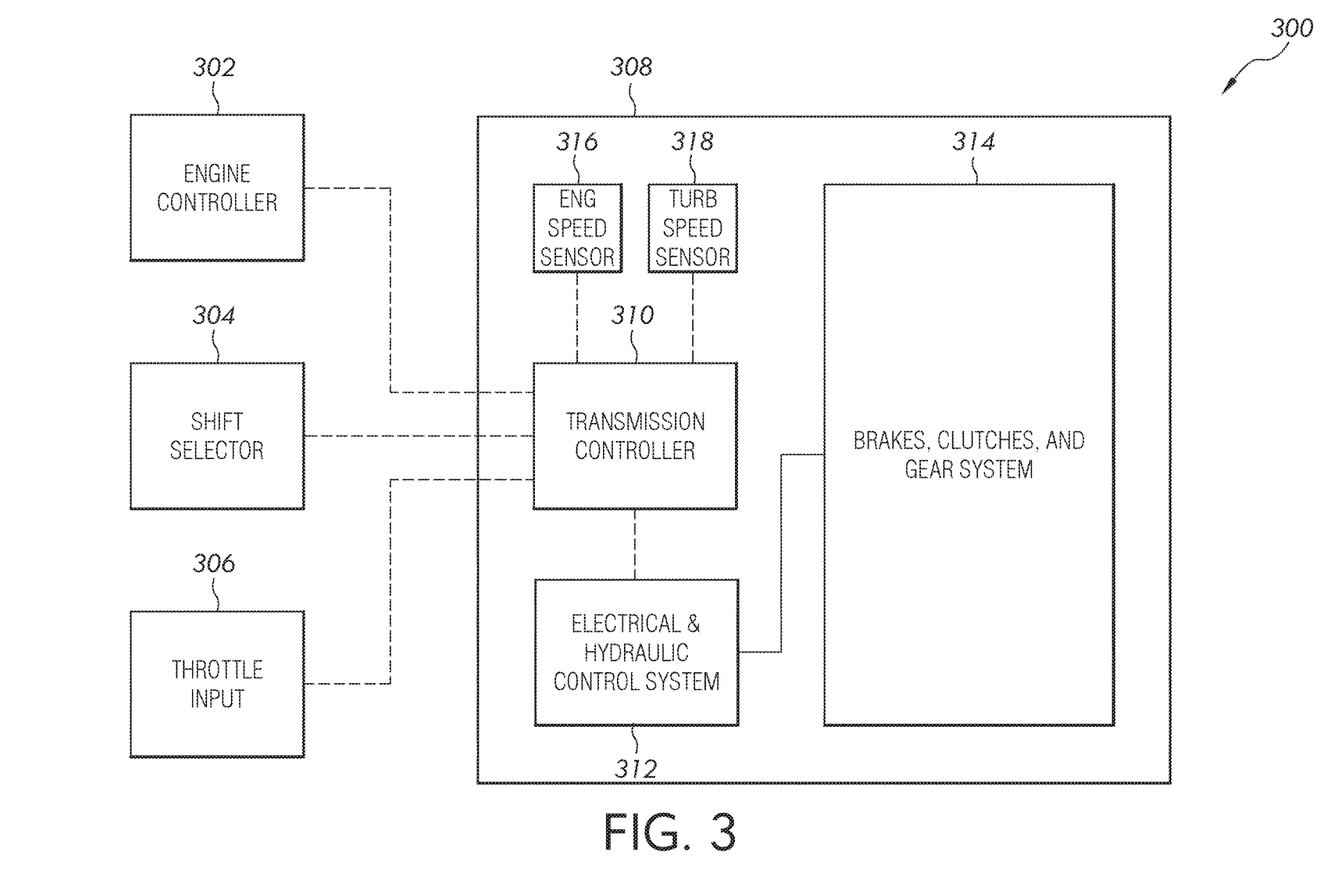
FIG. 3 is a diagram of a controls system of the transmission system of FIG. 2.
Figure 4:
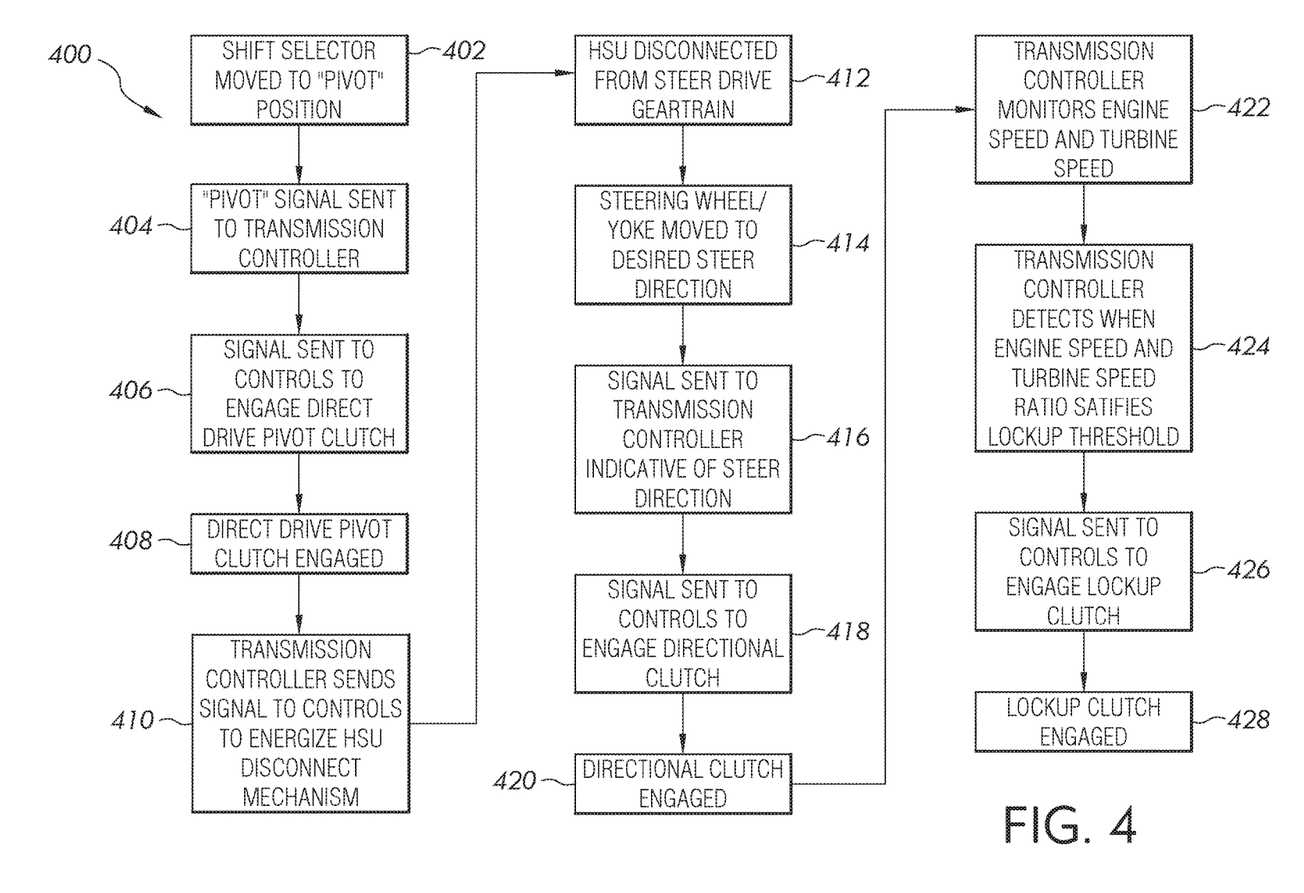
FIG. 4 is a method of controlling a direct drive pivot and lockup pivot of the transmission system of FIG. 2.

Before turning to FIG. 4, however, a vehicular controls system 300 is shown in FIG. 3. In this system 300, a vehicle or machine may include an engine or prime mover (not shown) that is operably controlled by an engine controller 302. An operator can selectively control the vehicle or machine by a shift selector 304 and a throttle input 306. The throttle input 306 may be a sensor that detects when an operator depresses an accelerator or throttle pedal. The sensor may communicate an electrical signal indicative of the amount of throttle desired by the operator. Other control mechanisms may be used by an operator to indicate a desired throttle input. Moreover, other control mechanisms including a brake system, steering system, and the like may further be included in the controls system 300.

As previously described, the shift selector 304 may be controlled by the operator to control both steering and direction of travel of the vehicle or machine. The shift selector 304 may include a plurality of positions such as forward, reverse, neutral and pivot. Other positions may include park, high, low, etc. The shift selector 304 may include a sensor that detects movement of the shift selector to each of its plurality of positions.

The vehicular controls system 300 further includes a transmission system 308, which may be similar to the transmission system 200 of FIG. 2. The transmission system 308 may include a transmission controller 310, a control system 312 such as a valve body with valves, solenoids, and other control elements, and a geartrain 314. The transmission controller 310 may be in electrical communication with the sensors that detect movement or changes to the shift selector 304 and throttle input 306. In FIG. 3, the dashed line represents an electrical connection (wired or wireless) and the solid line represents a hydraulic, mechanical or electro-hydraulic connection. The transmission controller 310 may be in electrical communication with the engine controller 302 for receiving or communicating various commands or instructions. In one example, engine speed may be communicated via the engine controller 302 to the transmission controller 310 over a J-1939 communication link.

The control system 312 of FIG. 3 may include a plurality of electrical and hydraulic control mechanisms such as solenoids, valves, sensors, etc. The control system 312 may be similar to the electro-hydraulic system 138 of FIG. 1. In at least one embodiment, the control system 312 may include a valve body with a plurality of fluid paths defined therein.

Referring to FIG. 3, sensors such as an input or engine speed sensor 316 and a turbine speed sensor 318 may also be included. The engine speed sensor 316 of FIG. 3 may correspond with the speed sensor 206 of FIG. 2, and the turbine speed sensor 318 may correspond with the other speed sensor 238 referenced in FIG. 2. The input speed sensor 316 and turbine speed sensor 318 may be in electrical communication with the transmission controller 310, as shown. Other sensors may be included in the transmission system 308 such as an output speed sensor, input torque sensor, output torque sensor, etc.

The geartrain 314 may include a plurality of friction devices, clutches, brakes, gears, shafts, etc. The plurality of friction devices may include, but are not limited to, one or more conventional brake devices, one or more torque transmitting devices, and the like. Similar to FIG. 1, the operation, i.e., engagement and disengagement, of the plurality of friction devices is controlled by selectively controlling the friction applied by each of the plurality of friction devices, such as by controlling fluid pressure to each of the friction devices. In one example, which is not intended to be limiting in any way, the plurality of friction devices include a plurality of brake and torque transmitting devices in the form of conventional clutches that may each be controllably engaged and disengaged via fluid pressure supplied by the control system 312.

In a further example, the steer drive geartrain 254 may be part of the geartrain 314. In addition, the bevel gearset 214, the first directional clutch 226, the second directional clutch 228, and the direct drive pivot clutch 246 may be included in the geartrain 314. In a further example, the HSU disconnect mechanism 266 may be included in the geartrain 314. Moreover, the steer planetary gearset 258 and output planetary gearset 272 may be included as part of the geartrain 314. In at least one embodiment, each gear, shaft, clutch, brake, and planetary gearset forms part of the geartrain 314 of FIG. 3.

As previously described, some vehicles or machines include a transmission system that is operable in forward, reverse, neutral, and pivot. In the pivot position or range, the transmission system functions to allow the operator to controllably pivot the vehicle or machine, e.g., steer through a 90° turn. In doing so, many conventional transmission systems overheat or are inefficient in the pivot position.

Referring to FIG. 4, a control method 400 is disclosed for providing an efficient pivot steer system that better regulates the temperature of the transmission system. In this control method 400, a plurality of blocks or steps may be executed. For example, a first block 402 of the method 400 may be executed when the shift selector 304 is moved or controlled to the "pivot" position. As this is done, the control method 400 may advance to block 404 in which a "pivot" signal may be communicated to the transmission controller 310 indicating that the operator desires to pivot the vehicle or machine.

Once the transmission controller 310 receives the "pivot" signal from the shift selector 304 or a sensor that detects movement of the shift selector 304, the controller 310 may further execute the control method 400 in block 406 by sending an instruction to the control system 312 or geartrain 314. The instruction in block 406 is to control the engagement of the direct drive pivot clutch 246. The direct drive pivot clutch 246 may be part of the geartrain 314, but the engagement or disengagement may be controlled by one or more solenoids or valves located in the control system 312. The direct drive pivot clutch 246 may be separate from the drivetrain 314, or it may be directly commanded to engage or disengage via the transmission controller 310. Any number of ways may be used for controlling the engagement or disengagement of the direct drive pivot clutch 246.

In any event, once block 406 is executed, the control method 400 may advance to block 408 in which the direct drive pivot clutch is engaged. Once the direct drive pivot clutch 246 is engaged, a torque path is established from the bevel gearset 214 through one of the directional clutches to the steer drive geartrain 254 via the direct drive pivot clutch 246. The control method 400 may next disconnect the HSU 240 to reduce losses through the transmission in block 410.

In block 410, for example, the transmission controller 310 may send a signal or instruction to the control system 312 to energize or otherwise decouple the HSU disconnect mechanism 266. The HSU disconnect mechanism 266 may normally be biased in the coupled or de-energized state. Thus, a solenoid or other control means in the control system 312 may decouple or energize the mechanism 266. As the HSU disconnect mechanism 266 is energized in block 410, the control method 400 can advance to block 412 whereby the torque path between the HSU 240 and steer planetary gearset 258 is interrupted or disconnected. Thus, torque may pass through the range input gearset 230 to the pump 242 of the HSU 240, but no torque is transferred to the steer planetary gearset 258 via the HSU 240. The torque path therefore is diverted or bypasses the HSU 240, and is now established through the direct drive pivot clutch 246 to the output planetary gearset 272.

In block 414, the operator may initiate movement in a steering device or yoke in a certain direction. This may be in a forward direction or reverse direction, for example. In any event, a signal indicative of the steer direction may be received by the transmission controller 310 in block 416. Once the transmission controller 310 receives the signal in block 416, the transmission controller 310 may send a signal or instruction to the control system 312 for engaging the first directional clutch 226 or second directional clutch 228 based on the operator's intent. The control system 312 may include a solenoid or other control means that can hydraulically control the engagement or disengagement of each directional clutch. The manner in which the directional clutch is engaged or disengaged is not limiting in this disclosure, and other known ways of engaging or disengaging the clutch are considered herein. For example, the controller 310 may directly communicate with the directional clutches to engage or disengage as necessary. The directional clutch corresponding to the operator's intent may be engaged in block 420.

In block 414, the steering direction may be sensed or detected by a positional sensor, a steer-by-wire, or any other sensing means for detecting a desired steer direction. Moreover, control logic may be stored in a memory unit of the transmission controller 310 and executed by a processor to perform one or more of the blocks of the control method 400. The control method 400 may be executed as a series of steps, one or more algorithms, software, etc. stored by the controller 310. Alternatively, the transmission controller 310 may communicate with another controller, e.g., the engine controller 302, for executing one or more blocks of the control method 400. Thus, the illustrated embodiment of FIG. 4 is only one example of how the pivot steer system may achieve improved efficiency while achieving a direct drive steer operation. For purposes of this disclosure, the direct drive steer operation refers to the condition when engine power is directly connected to the steer drive geartrain 254 via the direct drive pivot clutch 246, and when the HSU 240 is disconnected from the steer drive geartrain 254.

The pivot steer operation, however, can further be achieved by control method 400 by engaging the torque converter lockup clutch 210. By engaging the lockup clutch 210, transmission power efficiency can be further improved resulting in more engine power reaching the transmission output 284, and transmission temperature can be better regulated in this condition. To engage the lockup clutch 210, the control method 400 can advance from block 420 to block 422. In block 422, the transmission controller 310 monitors engine speed via engine speed sensor 206,316 and turbine speed via turbine speed sensor 238, 318.

The transmission controller 310 may store a lockup threshold value in its memory. The lockup threshold may be a value or ratio (e.g., 80% or less) between engine speed and turbine speed that is indicative of when it is appropriate to control the engagement of the lockup clutch 210. This threshold may be a predefined or predetermined ratio set such that when the lockup clutch 210 is engaged, the engine does not shutoff. This threshold may be any value and it may depend upon the type of vehicle or machine, engine, transmission, torque converter, lockup clutch, or application.

During operation, and in block 424, the transmission controller 310 may continuously monitor the relationship between engine speed and turbine speed. Once the relationship or ratio between the two speeds satisfies the lockup threshold, the control method 400 can advance to block 426. In block 426, the transmission controller 310 can communicate with the control system 312 to engage the lockup clutch 210. Other methods may be used for engaging the lockup clutch 210, and the manner in which the lockup clutch is engaged is non-limiting.

In any event, once the instruction is sent to engage the lockup clutch, the lockup clutch 210 may be engaged in block 428. Once it is engaged, the pivot lockup operation is achieved. Once pivot lockup is achieved, there is no fluid coupling across the torque converter 208 and losses from the torque converter 208 are reduced or eliminated. This may result in more efficient transmission resulting in greater power reaching the transmission output 284.

As described above, the control method may achieve the direct drive steer operation in advance of achieving pivot steer operation. Moreover, there may be a delay between the vehicle or machine actually moving in a pivot motion before the lockup clutch is engaged in block 428. Alternatively, the vehicle or machine may be capable of pivoting before the lockup clutch is engaged. This is due to the ratio of engine speed and turbine speed satisfying the lockup threshold. As the vehicle or machine begins to pivot or before it begins to pivot, the operator may increase a throttle command to the engine by engaging the throttle input 306. As the throttle command increases, engine speed will increase and the transmission controller 310 can detect or receive communications of both the increase in throttle input and engine speed. Once the engine speed and turbine speed ratio satisfies the lockup threshold, the lockup clutch may be engaged to achieve pivot steer operation.

Other embodiments of the transmission system 200, 300 and control method 400 are possible for accomplishing direct drive steer operation and pivot lockup operation. The aforementioned clutches or brakes may be selectively controlled by a solenoid in an electrohydraulic control system. Alternatively, electric or mechanical actuators may be used for engaging or disengaging clutches or brakes.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of controlling a transmission, comprising:
providing an input, an output, a control system, a hydrostatic unit, and a geartrain, the geartrain including a direct drive pivot clutch and a steer drive geartrain;
receiving a pivot command from a shift selector, the command indicating the shift selector is in a pivot position;
engaging the direct drive pivot clutch;
decoupling the hydrostatic unit from a first torque path defined between the input and the output; and
coupling the input and the output to one another via a second torque path, the second torque path defined through the direct drive pivot clutch and the steer drive geartrain.

2. The method of claim 1, further comprising:
providing a hydrostatic unit disconnect mechanism selectively coupled between the hydrostatic unit and the steer drive geartrain; and
energizing the hydrostatic unit disconnect mechanism to decouple the hydrostatic unit from the first torque path.

3. The method of claim 2, wherein the energizing step comprises sending an instruction to the control system to energize the hydrostatic unit disconnect mechanism.

4. The method of claim 1, further comprising directly coupling the direct drive pivot clutch to the steer drive geartrain.

5. The method of claim 1, further comprising communicating to the control system to engage the direct drive pivot clutch after the receiving step.

6. A method of controlling a transmission, comprising:
providing the transmission with an input, an output, a control system, a torque converter, a lockup clutch, a hydrostatic unit, and a geartrain, the geartrain including a first directional clutch, a second directional clutch, a direct drive pivot clutch, and a steer drive geartrain;
receiving a pivot command from a shift selector, the command indicating the shift selector is in a pivot position;
engaging the direct drive pivot clutch;
decoupling the hydrostatic unit to disconnect torque transfer through a first torque path defined between the input and the output;
receiving a steer command from a steering device, the steer command indicating a steer direction;
engaging either the first or second directional clutch based on the steer command;
detecting an input speed by a first sensor and a turbine speed by a second sensor;

comparing a ratio of the input speed and the turbine speed to a threshold;

engaging the lockup clutch when the ratio of the input speed and the turbine speed satisfy the threshold; and coupling the input and the output to one another to transfer torque therebetween via a second torque path, the second torque path defined through the lockup clutch, the direct drive pivot clutch and the steer drive geartrain.

7. The method of claim 6, further comprising:

providing a hydrostatic unit disconnect mechanism selectively coupled between the hydrostatic unit and the steer drive geartrain; and energizing the hydrostatic unit disconnect mechanism to decouple the hydrostatic unit from the first torque path.

8. The method of claim 7, wherein the energizing step comprises sending an instruction to the control system to energize the hydrostatic unit disconnect mechanism.

9. The method of claim 6, further comprising directly coupling the direct drive pivot clutch to the steer drive geartrain.

10. The method of claim 6, further comprising communicating to the control system to engage the direct drive pivot clutch after the receiving a pivot command step.

11. The method of claim 6, wherein:

the detecting an input speed comprises detecting input speed at the input or at a location between the input and the torque converter; and the detecting a turbine speed comprises detecting turbine speed at a location between the first and second directional clutches and the direct drive pivot clutch.

12. The method of claim 6, wherein the receiving the steer command comprises detecting a movement of a steering device in the steer direction.

13. The method of claim 6, further comprising:

providing a steer planetary gearset and an output planetary gearset between the input and the output, the steer planetary gearset including a sun gear, a carrier assembly, and a ring gear;

wherein the decoupling step comprises decoupling the hydrostatic unit from the sun gear of the steer planetary gearset.

14. The method of claim 13, further comprising transferring torque through the carrier assembly of the steer planetary gearset to a sun gear of the output planetary gearset.

15. The method of claim 14, further comprising transferring torque to the output via a carrier assembly of the output planetary gearset.

16. The method of claim 6, further comprising:

providing a steer transfer shaft of the steer drive geartrain, the steer transfer shaft disposed between the direct drive pivot clutch and the output; and splitting torque from the input to a first side and a second side of the transmission via a steer transfer shaft.

17. A transmission system, comprising:

a controller for controlling the transmission system, the controller configured to be in communication with a shift selector and a throttle input;

an input configured to receive input torque;

an output coupled to the input, the output configured to deliver output torque;

a control system disposed in communication with the controller;

a geartrain coupled to the control system, the geartrain including a first directional clutch, a second directional clutch, a direct drive pivot clutch, and a steer drive geartrain;

a hydrostatic unit including a pump and a motor, the pump being operably coupled to the input and the motor being operably coupled to the output; and a hydrostatic unit disconnect mechanism disposed between the hydrostatic unit and the output, the hydrostatic unit disconnect mechanism being operably controlled between a coupled position and a decoupled position;

wherein, the transmission system is configurable in a normal operation, a direct drive steer operation, and a pivot lockup operation;

wherein, when configured in the direct drive steer operation, the direct drive pivot clutch is disposed in its engaged position, the hydrostatic unit disconnect mechanism is disposed in its decoupled position, and the hydrostatic unit is disconnected from the steer drive geartrain and the output.

18. The transmission system of claim 17, further comprising a torque path defined between the input and the output, wherein:

in normal operation, the torque path is defined between the input and the output through the hydrostatic unit and the steer drive geartrain; and in direct drive steer operation, the torque path is defined between the input and the output through the direct drive pivot clutch and the steer drive geartrain.

19. The transmission system of claim 17, further comprising a torque converter and a lockup clutch;

wherein, when configured in the pivot lockup operation, either the first or second directional clutch is disposed in its engaged position, the direct drive pivot clutch is disposed in its engaged position, the hydrostatic unit disconnect mechanism is disposed in its decoupled position, the hydrostatic unit is disconnected from the steer drive geartrain and the output, and the lockup clutch is disposed in its engaged position.

20. The transmission system of claim 19, further comprising a torque path defined between the input and the output, wherein:

in normal operation, the torque path is defined between the input and the output through the hydrostatic unit and the steer drive geartrain; and in pivot lockup operation, the torque path is defined between the input and the output through the lockup clutch, the direct drive pivot clutch and the steer drive geartrain.

* * * * *